No. 686,990. Patented Nov. 19, 1901.
J. H. SCHROEDER.
HORSESHOE.
(Application filed July 15, 1901.)

(No Model.)

Witnesses:
F. W. Dueuckel.
J. D. Rippey.

Inventor:
Jos. H. Schroeder,
by Higdon & Longan,
Attorneys.

THE NORRIS PETERS CO., PHOTO-LITHO., WASHINGTON, D. C.

UNITED STATES PATENT OFFICE.

JOSEPH H. SCHROEDER, OF ST. LOUIS, MISSOURI.

HORSESHOE.

SPECIFICATION forming part of Letters Patent No. 686,990, dated November 19, 1901.

Application filed July 15, 1901. Serial No. 68,312. (No model.)

*To all whom it may concern:*

Be it known that I, JOSEPH H. SCHROEDER, of the city of St. Louis, State of Missouri, have invented certain new and useful Improvements in Horseshoes, of which the following is a full, clear, and exact description, reference being had to the accompanying drawings, forming a part hereof.

This invention relates to horseshoes; and it consists of the novel construction, combination, and arrangement of parts hereinafter shown, described, and claimed.

Figure 1:
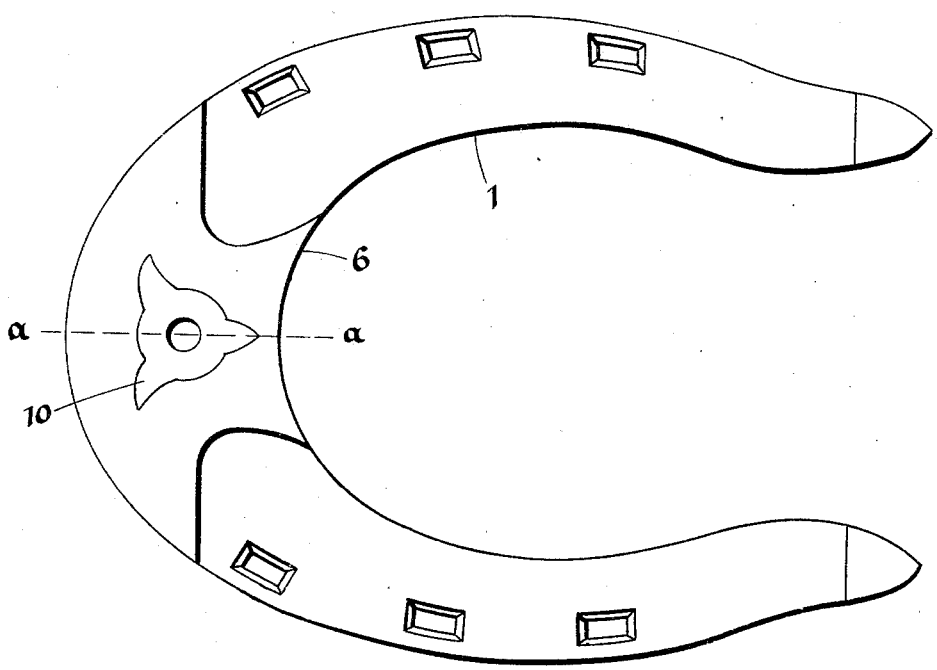
Figure 2:
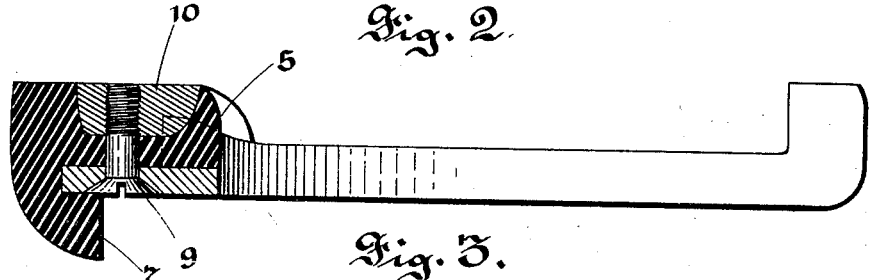
Figure 3:
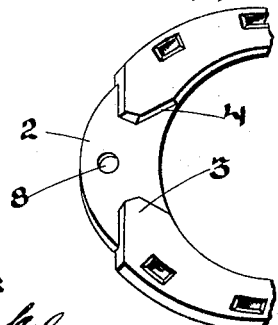

Figure 1 is a view showing the under surface of my improved horseshoe. Fig. 2 is a sectional view taken on the line $a\,a$ of Fig. 1. Fig. 3 is a perspective view of a portion of the shoe with the front calk removed.

1 indicates a horseshoe of usual shape, having a notch 2 formed in the under side of the toe and extensions 3 integral with the sides of the shoe and projecting into said notch 2, as clearly shown in Fig. 3. The said extensions 3 are cut away on each side, as indicated by 4.

5 indicates a section of elastic material, preferably of rubber, which is fitted into the notch 2 and the rear side of which has integral tongues 6 bearing against the rear cut-away faces 4 of the extensions 3. A clip 7 is integral with the front side of the calk 5 and extends above the shoe, a notch being formed therein to receive the forward edge of the portion 2 of the horseshoe. The said calk 5 is provided with a central opening, and a similar opening 8 is formed in the thin portion of the shoe at the notch 2, and a screw-bolt 9 passes through the said openings and is threaded into a nut 10, located in a depression in the under side of the said calk 5. When attached, as described, the calk will be securely held in position by the sides of the horseshoe, preventing it from moving laterally, and the screw-bolt 9 will prevent the same from becoming detached from the shoe.

The shoe may be applied to a horse in the usual manner, and the elastic calk prevents injury in case the horse overreaches or interferes or otherwise strikes the shoe against any portion of the body. Being detachable, the calk may be removed when it becomes worn and another substituted.

I claim—

1. A horseshoe having a notch 2 formed in the toe thereof, extensions 3 projecting into the said notch, a calk 5 of elastic material fitted within the notch and having the tongues 6 extending behind the extensions 3, a nut 10 located within the depression formed in the calk, and a screw-bolt 9 extending through an opening in the horseshoe and being threaded into the said nut 10, substantially as specified.

2. A horseshoe having a notch 2 formed in the toe thereof, extensions 3 projecting into said notch, a calk 5 of elastic material fitted within the said notch, tongues 6 integral with said calk and extending behind the extensions 3, a clip 7 integral with the said calk 5, a nut 10 located within a depression in the said calk 5, and a screw-bolt 9 extending through an opening in the horseshoe and being threaded into the said nut 10, substantially as specified.

In testimony whereof I affix my signature in presence of two witnesses.

JOSEPH H. SCHROEDER.

Witnesses:
 JOHN C. HIGDON,
 ALFRED A. EICKS.